US012154714B2

(12) United States Patent
Shigematsu et al.

(10) Patent No.: US 12,154,714 B2
(45) Date of Patent: Nov. 26, 2024

(54) MULTI-TERMINAL CHIP INDUCTOR

(71) Applicant: Murata Manufacturing Co., Ltd., Nagaokakyo (JP)

(72) Inventors: Satoshi Shigematsu, Nagaokakyo (JP); Kenichi Ishizuka, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 618 days.

(21) Appl. No.: 17/518,669

(22) Filed: Nov. 4, 2021

(65) Prior Publication Data

US 2022/0059278 A1 Feb. 24, 2022

Related U.S. Application Data

(63) Continuation of application No. PCT/JP2020/043986, filed on Nov. 26, 2020.

(30) Foreign Application Priority Data

Dec. 25, 2019 (JP) ................................ 2019-233777

(51) Int. Cl.
*H01F 5/00* (2006.01)
*H01F 27/28* (2006.01)
*H01F 27/29* (2006.01)

(52) U.S. Cl.
CPC ......... *H01F 27/2804* (2013.01); *H01F 27/29* (2013.01); *H01F 2027/2809* (2013.01)

(58) Field of Classification Search
CPC .................................................. H01F 27/2804
USPC .......................................................... 336/200
See application file for complete search history.

(56) References Cited

U.S. PATENT DOCUMENTS 8,669,839 B2 * 3/2014 Yokoyama .......... H01F 17/0013 336/200
9,058,927 B2 * 6/2015 Takezawa ........... H01F 27/2804
9,142,344 B2 * 9/2015 Tachibana ........... H01F 27/2804
2007/0296536 A1 * 12/2007 Odahara ............. H01F 17/0013 336/200
2008/0197963 A1 * 8/2008 Muto .................. H01F 17/0013 336/200

(Continued)

FOREIGN PATENT DOCUMENTS

JP 09-35942 A 2/1997
JP 10-208943 A 8/1998

(Continued)

OTHER PUBLICATIONS

Official Communication issued in International Patent Application No. PCT/JP2020/043986, mailed on Mar. 2, 2021.

*Primary Examiner* — Ronald Hinson
(74) *Attorney, Agent, or Firm* — Keating & Bennett, LLP

(57) ABSTRACT

A multi-terminal chip inductor includes coil conductors in base material layers, an interlayer connection conductor connecting the coil conductors across layers, and external electrodes each connected to portions of a series of coil conductors defined by the coil conductors and the interlayer connection conductor. The external electrodes include a common external electrode. A first of the coil conductors to which the common external electrode and a first external electrode adjacent to the common external electrode in a circuit are connected, includes first coil conductors connected to each other in parallel.

9 Claims, 7 Drawing Sheets

(56) References Cited

U.S. PATENT DOCUMENTS

| | | | | |
|---|---|---|---|---|
| 2010/0127812 | A1* | 5/2010 | Maeda | H01F 3/08 336/200 |
| 2012/0056705 | A1* | 3/2012 | Kim | H01F 17/0033 336/200 |
| 2015/0294779 | A1* | 10/2015 | Lim | H01F 27/292 336/192 |
| 2016/0099102 | A1* | 4/2016 | Matsunaga | H01F 17/0013 336/105 |
| 2016/0233017 | A1 | 8/2016 | Murase | |
| 2016/0248450 | A1 | 8/2016 | Ishizuka | |
| 2016/0248456 | A1* | 8/2016 | Tomisawa | H04B 1/0475 |
| 2017/0117868 | A1* | 4/2017 | Ishizuka | H01F 27/40 |
| 2017/0372833 | A1 | 12/2017 | Jang et al. | |
| 2018/0069524 | A1* | 3/2018 | Ishizuka | H03H 7/38 |
| 2018/0358174 | A1 | 12/2018 | Komachi et al. | |
| 2019/0006075 | A1 | 1/2019 | Okabe et al. | |

FOREIGN PATENT DOCUMENTS

| | | | |
|---|---|---|---|
| JP | 2000-216022 | A | 8/2000 |
| JP | 2009-094149 | A | 4/2009 |
| JP | 2017-199766 | A | 11/2017 |
| JP | 2017-228764 | A | 12/2017 |
| JP | 2019-003993 | A | 1/2019 |
| JP | 2019-016618 | A | 1/2019 |
| WO | 2015/064330 | A1 | 5/2015 |
| WO | 2015/068613 | A1 | 5/2015 |

* cited by examiner

MULTI-TERMINAL CHIP INDUCTOR

CROSS REFERENCE TO RELATED APPLICATIONS

This application claims the benefit of priority to Japanese Patent Application No. 2019-233777 filed on Dec. 25, 2019 and is a Continuation Application of PCT Application No. PCT/JP2020/043986 filed on Nov. 26, 2020. The entire contents of each application are hereby incorporated herein by reference.

BACKGROUND OF THE INVENTION

1. Field of the Invention

The present invention relates to a multi-terminal chip inductor including a coil conductor in a multilayer body including a plurality of base material layers and used as an element including a plurality of inductance values.

2. Description of the Related Art

In the past, a laminated inductance element having a plurality of inductance values has been formed by providing a coil conductor in a multilayer body of base material layers.

For example, Japanese Unexamined Patent Application Publication No. 10-208943 discloses a laminated inductance element in which a spiral laminated coil and a lead wire connecting the middle of the coil to a terminal are formed in a ferrite multilayer body.

In general, a laminated inductance element having a plurality of inductance values may be obtained by providing a plurality of independent coils in a multilayer body. However, when the plurality of independent coils are provided in this manner, the coils interfere with each other, and the Q factor of each inductor decreases as compared with a case in which each inductor is in an independent state.

As disclosed in Japanese Unexamined Patent Application Publication No. 10-208943, in a configuration in which a series of coil conductor patterns are formed and the middle thereof is led out to a terminal, the above-described interference between the coils may be avoided. Thus, an inductance element having a high Q factor is able to be formed, but in order to obtain a higher Q factor, the line width or thickness of the coil conductor pattern needs to be increased, and as a result, the size increases.

SUMMARY OF THE INVENTION

Preferred embodiments of the present invention provide multi-terminal chip inductors each of which may be used as an inductance element having an increased Q factor, while reducing or preventing interference between the coils without increasing in size.

A multi-terminal chip inductor according to a preferred embodiment of the present invention includes a plurality of base material layers, a plurality of coil conductors each provided in a plurality of predetermined base material layers among the plurality of base material layers, an interlayer connection conductor connecting the plurality of coil conductors across layers, and a plurality of external electrodes each connected to the plurality of coil conductors, a series of coil conductors including a common coil opening are defined by the plurality of coil conductors and the interlayer connection conductor, the plurality of external electrodes include a common external electrode, a first external electrode adjacent to the common external electrode in a circuit, and a second external electrode farther away from the common external electrode in the circuit than the first external electrode, the series of coil conductors includes a first coil conductor that is a portion connected between the common external electrode and the first external electrode, and a second coil conductor that is a portion connected between the first external electrode and the second external electrode, and the first coil conductor includes a plurality of coil conductors connected to each other in parallel.

With the above configuration, a plurality of coil conductors connected in parallel are used regardless of the inductance value to be selected. This effectively increases the Q factor of the inductance element observed from each external electrode.

According to preferred embodiments of the present invention, interference between coils is reduced or prevented and a multi-terminal chip inductor which may be used as an inductance element having a high Q factor may be obtained without increasing in size.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
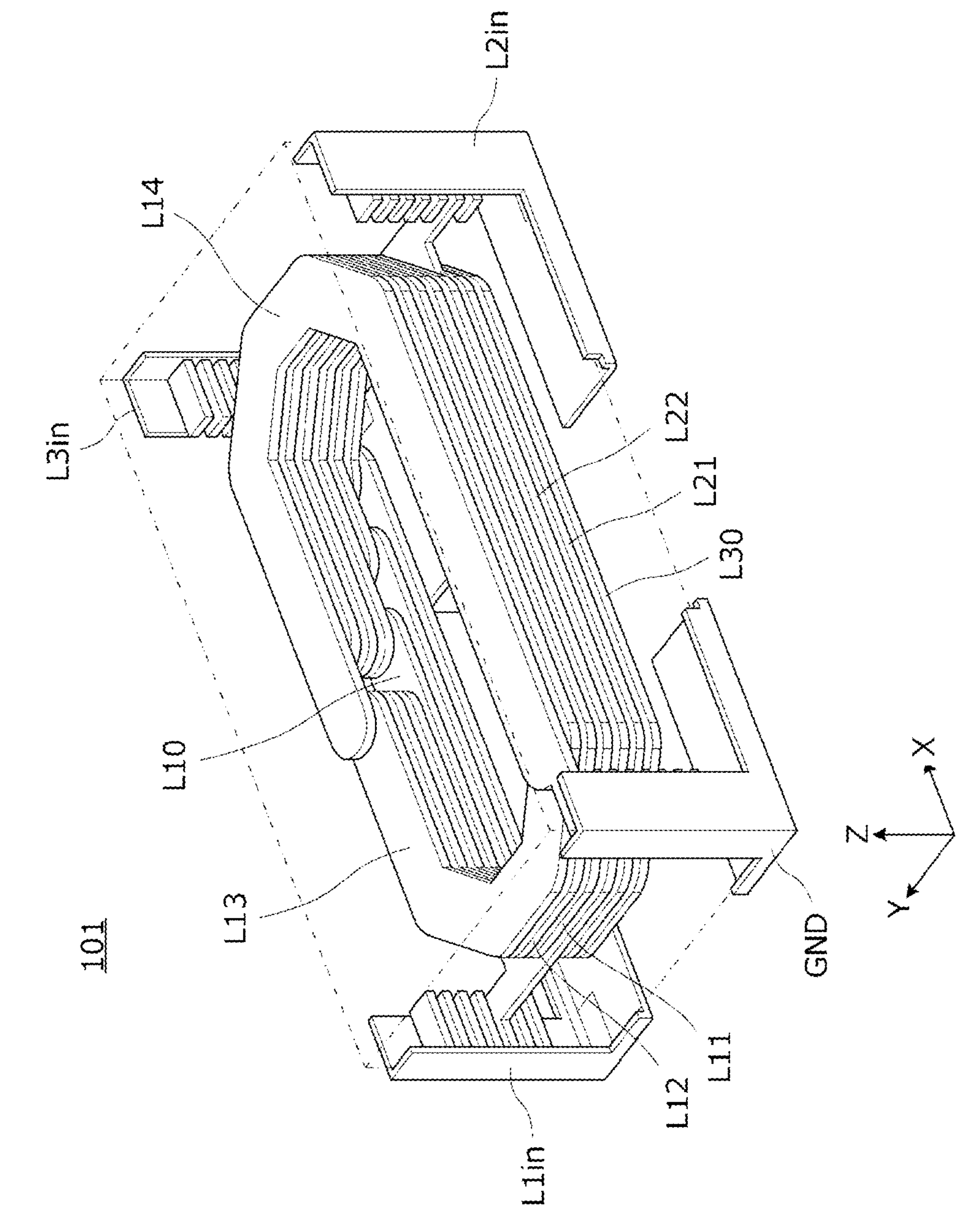
FIG. 1 is a transparent perspective view of a multi-terminal chip inductor 101 according to a first preferred embodiment illustrating an internal structure.

Hereinafter, preferred embodiments of the present invention will be described using some specific examples with reference to the drawings. In the drawings, the same or corresponding portions are denoted by the same reference characters. Although the preferred embodiments will be described by being divided into a plurality of preferred embodiments for convenience in view of the ease of explaining the points or the ease of understanding the contents, partial substitutions or combinations of the configurations in different preferred embodiments are possible. In a second and subsequent preferred embodiments, the description of matters common to a first preferred embodiment will be omitted, and only different points will be described. In particular, the same advantageous operations and effects by the same or corresponding configurations will not be described one by one for each preferred embodiment.

First Preferred Embodiment

Figure 2:
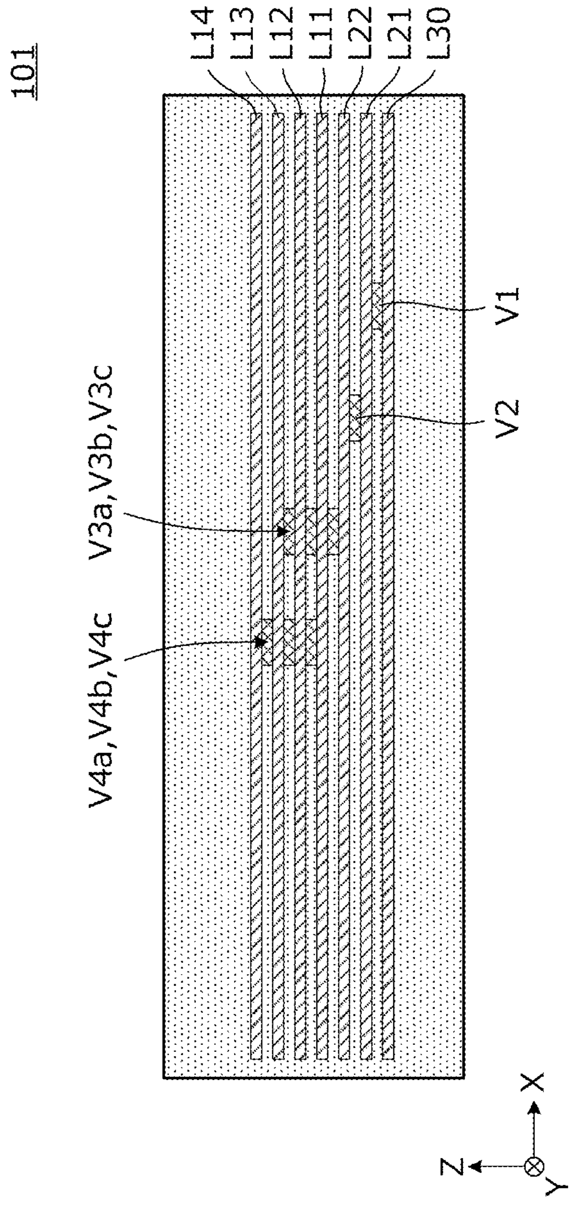
FIG. 2 is a front view of the multi-terminal chip inductor 101 in FIG. 1 viewed in a Y direction.
Figure 3:
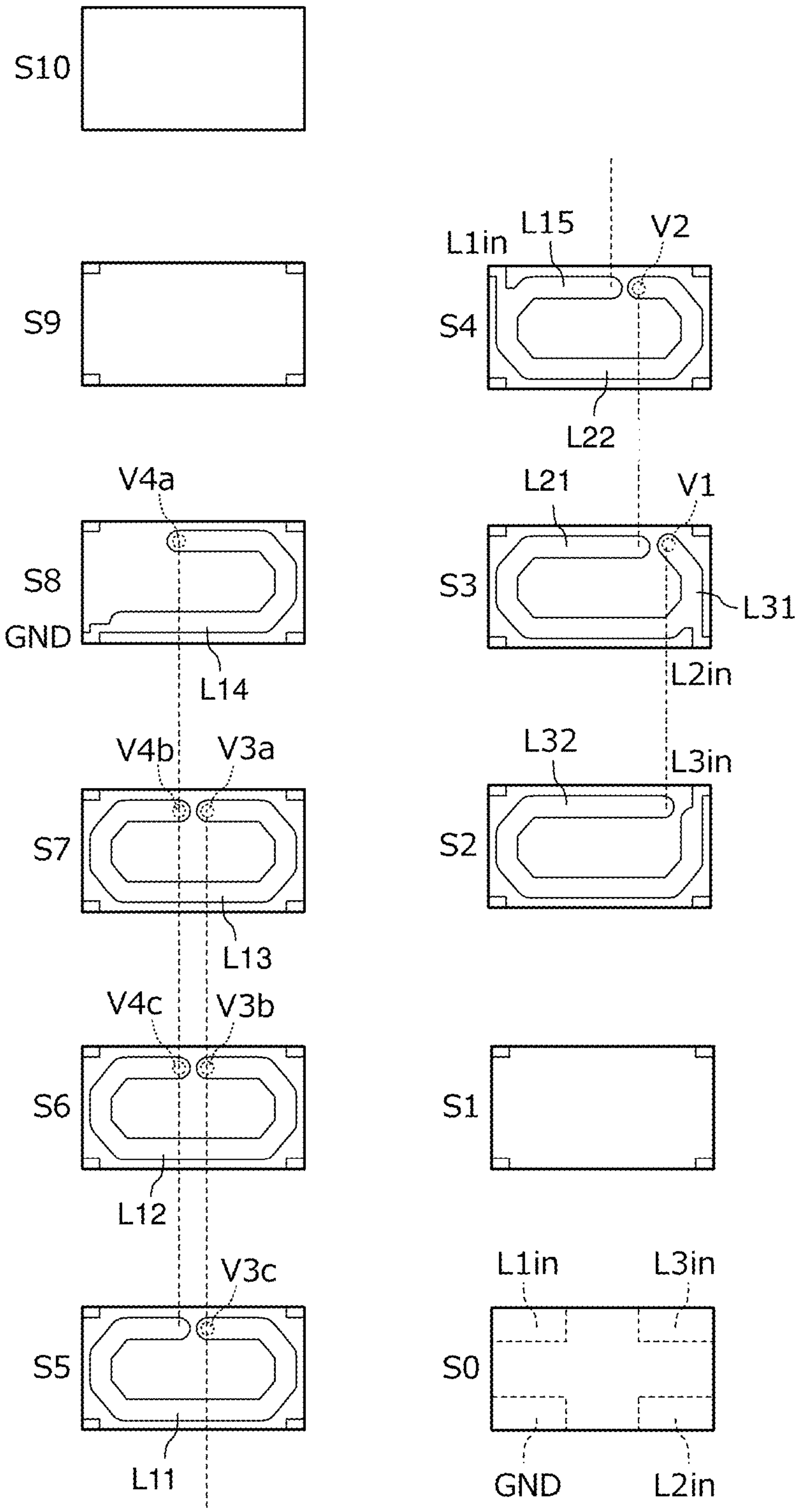
FIG. 3 is an exploded plan view of the multi-terminal chip inductor 101 illustrating a conductor pattern provided in each base material layer.
Figure 4:
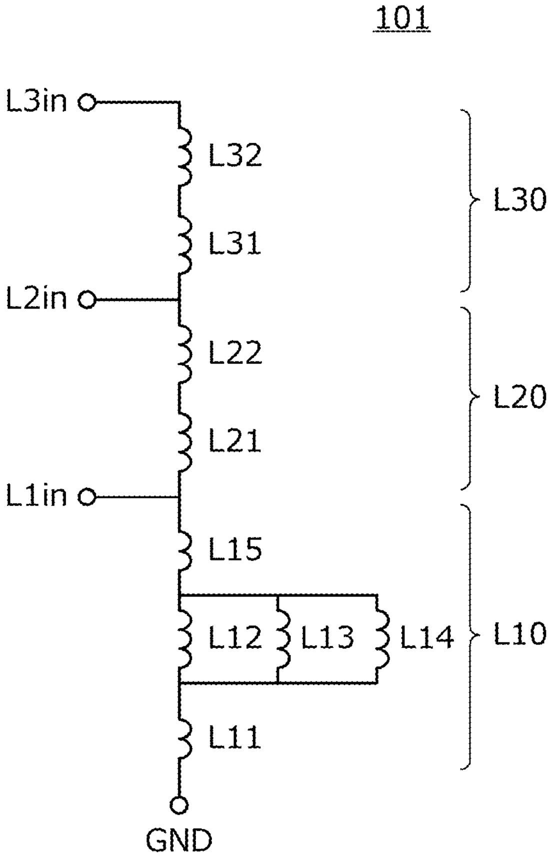
FIG. 4 is a circuit diagram of the multi-terminal chip inductor 101.

FIG. 1 is a transparent perspective view of a multi-terminal chip inductor 101 according to a first preferred embodiment of the present invention illustrating an internal structure. FIG. 2 is a front view of the multi-terminal chip inductor 101 in FIG. 1 viewed in a Y direction of an XYZ coordinate system. Note that external electrodes, which will be described later, are not illustrated. FIG. 3 is an exploded plan view of the multi-terminal chip inductor 101 illustrating a conductor pattern formed in each base material layer. FIG. 4 is a circuit diagram of the multi-terminal chip inductor 101.

The multi-terminal chip inductor 101 includes a plurality of base material layers S1 to S10, a plurality of coil conductors each provided in a predetermined plurality of base material layers S2 to S8 among the plurality of base material layers S1 to S10, an interlayer connection conductor connecting the plurality of coil conductors across layers, and a plurality of external electrodes L1in, L2in, L3in, and GND each connected to a plurality of portions of a series of coil conductors defined by the plurality of coil conductors and the interlayer connection conductor.

In FIG. 3, a bottom surface S0 of the multilayer body including the base material layers S1 to S10 is also illustrated. The bottom surface S0 is a mounting surface of the multi-terminal chip inductor 101. A first coil conductor L14 is provided in the base material layer S8. A first coil conductor L13 is provided in the base material layer S7, a first coil conductor L12 is provided in the base material layer S6, and a first coil conductor L11 is provided in the base material layer S5. A first coil conductor L15 and a second coil conductor L22 are provided in the base material layer S4. A second coil conductor L21 and a third coil conductor L31 are provided in the base material layer S3. A third coil conductor L32 is provided in the base material layer S2.

An interlayer connection conductor V4*a* is provided in the base material layer S8, interlayer connection conductors V4*b* and V3*a* are provided in the base material layer S7, and interlayer connection conductors V4*c* and V3*b* are provided in the base material layer S6. An interlayer connection conductor V3*c* is provided in the base material layer S5, an interlayer connection conductor V2 is provided in the base material layer S4, and an interlayer connection conductor V1 is provided in the base material layer S3.

A first end of the first coil conductor L14 is connected to the common external electrode GND. The interlayer connection conductor V4*a* connects a second end of the first coil conductor L14 and a first end of the first coil conductor L13 across layers. The interlayer connection conductor V4*b* connects the first end of the first coil conductor L13 and a first end of the first coil conductor L12 across layers. The interlayer connection conductor V4*c* connects a first end of the first coil conductor L11 and the first end of the first coil conductor L12 across layers.

The interlayer connection conductor V3*a* connects a second end of the first coil conductor L13 and a second end of the first coil conductor L12 across layers. The interlayer connection conductor V3*b* connects a second end of the first coil conductor L11 and the second end of the first coil conductor L12 across layers. The interlayer connection conductor V3*c* connects a first end of the first coil conductor L15 and the second end of the first coil conductor L11 across layers.

The interlayer connection conductor V2 connects a first end of the second coil conductor L21 and a second end of a second coil conductor L22 across layers, and the interlayer connection conductor V1 connects a first end of the third coil conductor L32 and a second end of the third coil conductor L31 across layers.

A second end of the first coil conductor L15 and a first end of the second coil conductor L22 are connected (continuous) to each other, and the second end of the first coil conductor L15 and the first end of the second coil conductor L22 are connected to the external electrode L1in. A second end of the second coil conductor L21 and a first end of the third coil conductor L31 are connected (continuous) to each other, and the second end of the second coil conductor L21 and the first end of the third coil conductor L31 are connected to the external electrode L2in.

As described above, a series of coil conductors including a plurality of turns is defined by the plurality of coil conductors and the plurality of interlayer connection conductors. The series of coil conductors has a shape that extends around the same portion when viewed from the lamination direction of the plurality of base material layers (viewed in a Z direction). The plurality of first coil conductors L12, L13, and L14 connected to each other in parallel has the same or substantially the same shape when viewed from the lamination direction of the plurality of base material layers (viewed in the Z direction). In the present preferred embodiment, the series of coil conductors has a shape that extends along the sides of a flat octagonal or substantially octagonal shape.

In FIG. 3, each of the base material layers S1, S9, and S10 is represented by one layer, but may include a plurality of base material layers, as necessary.

The base material layers S1 to S10 are formed by, for example, screen-printing, exposure, and development of a photosensitive insulation paste and a photosensitive conductive paste, and a multilayer body is formed by laminating these base material layers.

Specifically, the photosensitive insulation paste layer is, for example, screen-printed, irradiated with ultraviolet rays, and developed with an alkali solution. Thus, an insulation base material pattern including an opening for an external electrode, a via hole, or the like is provided. Further, a photosensitive conductive paste is, for example, screen-printed, irradiated with ultraviolet rays, and developed with an alkali solution to form a conductor pattern. A mother multilayer body is obtained by laminating the insulation base material pattern and the conductor pattern. Thereafter, the mother multilayer body is divided into individual pieces to obtain a large number of multilayer bodies. In order to improve solderability, conductivity, and environmental resistance, Ni/Au, for example, is plated on the surface of each external electrode.

A method of forming the multilayer body is not limited to the examples described above. For example, a method may be provided in which a conductive paste is printed by a screen mask including an opening in the shape of a conductor pattern and laminating is performed. A conductor foil may be attached to an insulation base material, and a conductor pattern of each base material layer may be formed by patterning the conductor foil. Further, the method of forming the external electrodes is not limited to the above-described example. For example, the external electrodes may be formed on the bottom surface and the side surface of the multilayer body by dipping or sputtering of a conductive paste on the laminated base body, and further, the surfaces thereof may be plated.

As illustrated in FIG. 3 and FIG. 4, of the first coil conductors L11 to L15 connected between the common external electrode GND and the external electrode L1in adjacent to the external electrode GND in the circuit, the first coil conductors L12, L13, and L14 are connected in parallel.

In FIG. 4, the first coil conductors L11 to L15 may be collectively referred to as a first coil conductor L10, the second coil conductors L21 and L22 may be collectively referred to as a second coil conductor L20, and the third coil conductors L31 and L32 may be collectively referred to as a third coil conductor L30. The inductance between the external electrodes L1in and GND is the inductance of the inductor due to the first coil conductor L10, the inductance between the external electrodes L2in and GND is the inductance of the inductor due to the first coil conductor L10 and the second coil conductor L20, and the inductance between the external electrodes L3in and GND is the inductance of the inductor due to the coil conductors L10, L20, and L30.

As described above, the first coil conductor L10 connected between the common external electrode GND and the first external electrode L1in includes the plurality of coil conductors connected in parallel. This results in the Q factor of the coil defined by the first coil conductor L10 being higher than that in the configuration without the portion connected in parallel. Further, the first coil conductor L10 is included in the inductor in any of the cases in which: the coil conductor between the external electrodes L1in and GND is used, the coil conductor between the external electrodes L2in and GND is used, and the coil conductor between the external electrodes L3in and GND is used. This makes it possible for the inductor to be used as an inductor having a high Q factor in any of the cases above. In a case in which all of the first coil conductor L10, the second coil conductor L20, and the third coil conductor L30 are configured to have a parallel connection structure, the Q factor of the coil may be increased, but the overall size becomes very large. In order to obtain a chip element having a limited size, it is important and effective that the first coil conductor L10 connected between the common external electrode GND and the first external electrode L1in includes a plurality of coil conductors connected in parallel.

The series of coil conductors has a shape extending around the same or substantially the same portion when viewed from the lamination direction of the plurality of base material layers, that is, the inner edge (coil opening) of the coil and the outer edge of the coil provided over the plurality of layers by the series of coil conductors overlap in the lamination direction. This makes the magnetic fluxes extending around the respective portions of the coil conductors overlap so as to increase the inductance of the inductor. Thus, it is possible to shorten the line length of the coil conductor to obtain the required inductance, and a higher Q factor may be obtained accordingly.

The Q factor may be improved by widening the line width of the first coil conductor whose Q factor is to be increased, and in the examples illustrated in FIG. 1, FIG. 3, and the like, not only the first coil conductor L10 but also the entire or substantially the entire series of coil conductors has the same or substantially the same line width. This enables the overlapping effect of the magnetic fluxes extending around the respective portions of the coil conductors to be large, and a higher Q factor may be obtained.

Further, in the present preferred embodiment, the first coil conductor L10 including the plurality of coil conductors connected in parallel is arranged closer to the side of the surface opposite to the mounting surface, which is one end surface in the lamination direction of the plurality of base material layers, than other coil conductors. Thus, in a state in which the multi-terminal chip inductor 101 is mounted on the circuit board of an electronic device, the first coil conductor L10 is positioned farther away from the ground conductor provided in the circuit board. This enables the generation of eddy currents due to unnecessary coupling with the ground conductor to be reduced or prevented, and a decrease in the Q factor of the inductor is reduced or prevented.

Here, an example configuration of a multi-terminal chip inductor according to a comparative example with respect to the multi-terminal chip inductor 101 of the present preferred embodiment will be described, and the difference of characteristics between the stated multi-terminal chip inductor and the multi-terminal chip inductor of the present preferred embodiment will be explained.

Figure 7:
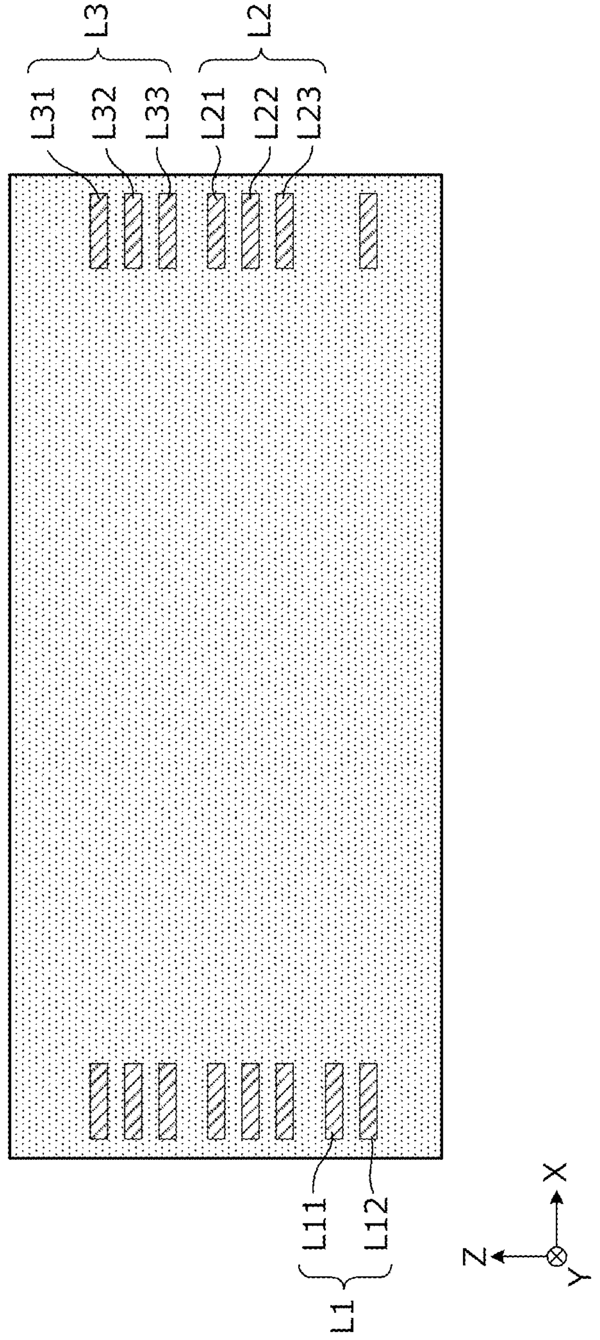
FIG. 7 is a front view of a multi-terminal chip inductor according to a comparative example.
Figure 8:
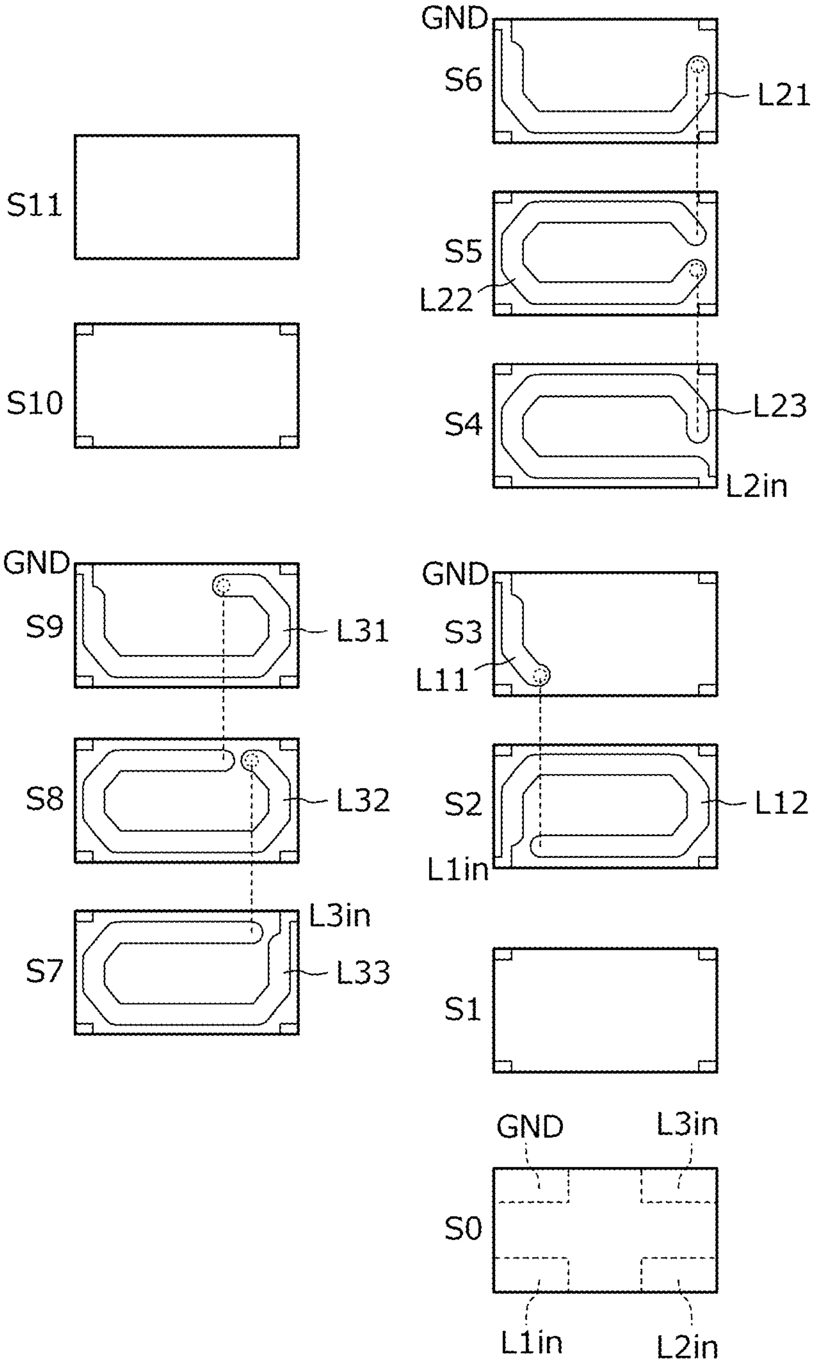
FIG. 8 is an exploded plan view of a conductor pattern formed in each base material layer of the multi-terminal chip inductor in FIG. 7.

FIG. 7 is a front view of a multi-terminal chip inductor according to the comparative example. Note that, similarly to the example in FIG. 2, the external electrodes are not illustrated. FIG. 8 is an exploded plan view of a conductor pattern provided in each base material layer of the multi-terminal chip inductor in FIG. 7.

The multi-terminal chip inductor according to the comparative example includes a plurality of base material layers S1 to S11. A first coil conductor L1 includes two layers of the first coil conductors L11 and L12, a second coil conductor L2 includes three layers of the second coil conductors L21 to L23, and a third coil conductor L3 includes three layers of the third coil conductors L31 to L33.

The characteristics of the multi-terminal chip inductor 101 described in the first preferred embodiment and the characteristics of the multi-terminal chip inductor according to the comparative example are as follows.

Multi-Terminal Chip Inductor 101

TABLE 1

| Inductor | Inductance [nH] @ 1 GHz | Q factor @ 1 GHz |
|---|---|---|
| GND-L1in | 1.6 | 12.7 |
| GND-L2in | 4.2 | 15.5 |
| GND-L3in | 7.0 | 18.6 |

Multi-Terminal Chip Inductor of Comparative Example

TABLE 2

| Comparative Example | | |
|---|---|---|
| Inductor | Inductance [nH] @ 1 GHz | Q factor @ 1 GHz |
| L1 (GND-L1in) | 0.9 | 13.7 |
| L2 (GND-L2in) | 3.0 | 12.6 |
| L3 (GND-L3in) | 5.9 | 13.9 |

As is apparent from a comparison between Table 1 and Table 2, the Q factor is particularly improved for an inductor having a large inductance, such as the inductance between the external electrodes L3in and GND or the inductance between the external electrodes L2in and GND.

In the present preferred embodiment, the series of coil conductors has a shape that extends along the sides of a flat octagonal or substantially orthogonal shape, and the external electrodes L1in, L2in, L3in, and GND are disposed at four corresponding corners. This results in a relatively large gap to be provided between these external electrodes and the series of coil conductors, and the generation of eddy currents in the external electrodes L1in, L2in, L3in, and GND and a decrease in inductance are reduced or prevented.

Further, since the series of coil conductors extends along the edge of the base material layer keeping away from only the external electrodes L1in, L2in, L3in, and GND, the volume inside the multilayer body may efficiently be used.

Figure 5:
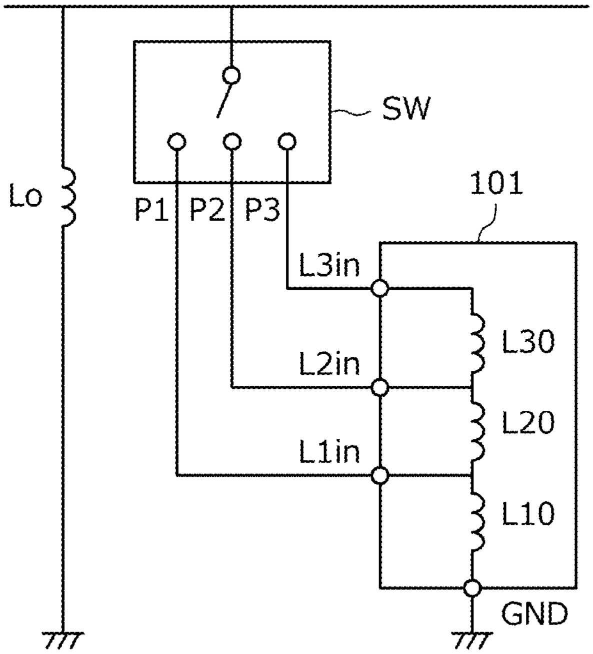
FIG. 5 is a resonant frequency adjustment circuit that supports carrier aggregation.

FIG. 5 illustrates a resonant frequency adjustment circuit that supports carrier aggregation. The resonant frequency adjustment circuit includes a main inductor L0, the multi-terminal chip inductor 101, and a switch SW. When the switch SW selects a first port P1, the inductor including the first coil conductor L10 is connected to the main inductor L0 in parallel. When the switch SW selects a second port P2, a series circuit of the inductor including the first coil conductor L10 and the inductor including the second coil conductor L20 is connected to the main inductor L0 in parallel. When the switch SW selects a third port P3, a series circuit of the inductor including the first coil conductor L10, the inductor including the second coil conductor L20, and the inductor including the third coil conductor L30 are connected to the main inductor L0 in parallel.

According to the present preferred embodiment, since the first coil conductor L10 connected to the common external electrode GND is a coil conductor including coil conductors connected in parallel, the Q factor of the entire multi-terminal chip inductor 101 may be increased.

When the inductance of the inductor due to the first coil conductor L10 is denoted by L10, the inductance of the inductor due to the second coil conductor L20 is denoted by L20, and the inductance of the inductor due to the third coil conductor L30 is denoted by L30, L10>L20>L30 may be satisfied. That is, the inductance of the inductor due to the first coil conductor L10 may be larger than the inductance of the inductor due to the second coil conductor L20, to which the first external electrode L1in and the second external electrode L2in adjacent to the first external electrode L1in in the circuit are connected.

With the above magnitude relationship of the inductance, the increase amount of the inductance becomes smaller in the order of the selection of the port P1, the selection of the port P2, and the selection of the port P3 of the switch SW. This makes it possible to finely adjust the resonant frequency.

Second Preferred Embodiment

In a second preferred embodiment of the present invention, a multi-terminal chip inductor including a smaller number of external electrodes than the multi-terminal chip inductor described in the first preferred embodiment is exemplified.

Figure 6:
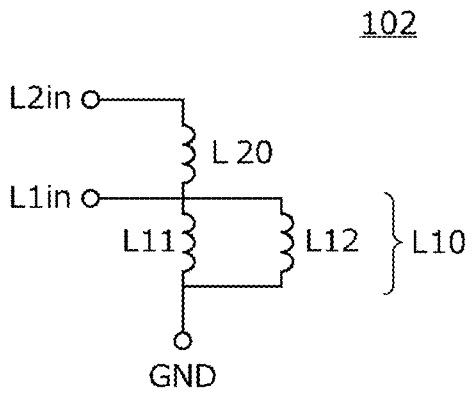
FIG. 6 is a circuit diagram of a multi-terminal chip inductor 102 according to a second preferred embodiment of the present invention.

FIG. 6 is a circuit diagram of a multi-terminal chip inductor 102 according to the second preferred embodiment. In the multi-terminal chip inductor 102, the first coil conductor L10, which is connected between the common external electrode GND and the external electrode L1in adjacent to the external electrode GND in the circuit, includes a parallel connection circuit of the first coil conductors L11 and L12.

As illustrated in the second preferred embodiment, the present invention may also be applied to a multi-terminal chip inductor including only the three external electrodes L1in, L2in, and GND as external electrodes.

Finally, the above description of the preferred embodiments is illustrative in all respects and not restrictive. Variations and modifications are possible for those skilled in the art. The scope of the present invention is indicated by the claims rather than by the preferred embodiments described above. Further, the scope of the present invention includes modifications from the preferred embodiments within the scope equivalent to the scope of the claims.

For example, preferred embodiments of the present invention may be applied when the number of external electrodes is three or more, and four or more external electrodes may be provided in addition to the common external electrode.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multi-terminal chip inductor, comprising: a plurality of base material layers; a plurality of coil conductors each provided in a plurality of predetermined base material layers among the plurality of base material layers; an interlayer connection conductor connecting the plurality of coil conductors across layers of the plurality of base material layers; and a plurality of external electrodes each connected to the plurality of coil conductors; wherein a series of coil conductors including a common coil opening are defined by the plurality of coil conductors and the interlayer connection conductor; the plurality of external electrodes include a common external electrode, a first external electrode adjacent to the common external electrode in a circuit, and a second external electrode farther away from the common external electrode in the circuit than the first external electrode; the series of coil conductors includes a first coil conductor connected between the common external electrode and the first external electrode, and a second coil conductor connected between the first external electrode and the second external electrode; and the first coil conductor includes coil conductors of the plurality of coil conductors that are connected to each other in parallel.

2. The multi-terminal chip inductor according to claim 1, wherein the series of coil conductors has a shape extending around a same or substantially a same portion when viewed from a lamination direction of the plurality of base material layers.

3. The multi-terminal chip inductor according to claim 2, wherein the coil conductors connected to each other in parallel has a same or substantially a same shape when viewed from the lamination direction of the plurality of base material layers.

4. The multi-terminal chip inductor according to claim 1, wherein the first coil conductor is closer to a side of a surface opposite to a mounting surface, which is one end surface of the plurality of base material layers in a lamination direction, than the second coil conductor.

5. The multi-terminal chip inductor according to claim 1, wherein the interlayer connection conductor connects an end of the first coil conductor and an end of the first coil conductor.

6. The multi-terminal chip inductor according to claim 1, wherein the series of coil conductors includes a plurality of turns.

7. The multi-terminal chip inductor according to claim 1, wherein each of the plurality of base material layers includes a plurality of layers.

8. The multi-terminal chip inductor according to claim 2, wherein the shape of the series of coil conductors is octagonal or substantially octagonal.

9. The multi-terminal chip inductor according to claim 1, wherein each of the plurality of base material layers includes a photosensitive insulation material.

* * * * *